UNITED STATES PATENT OFFICE.

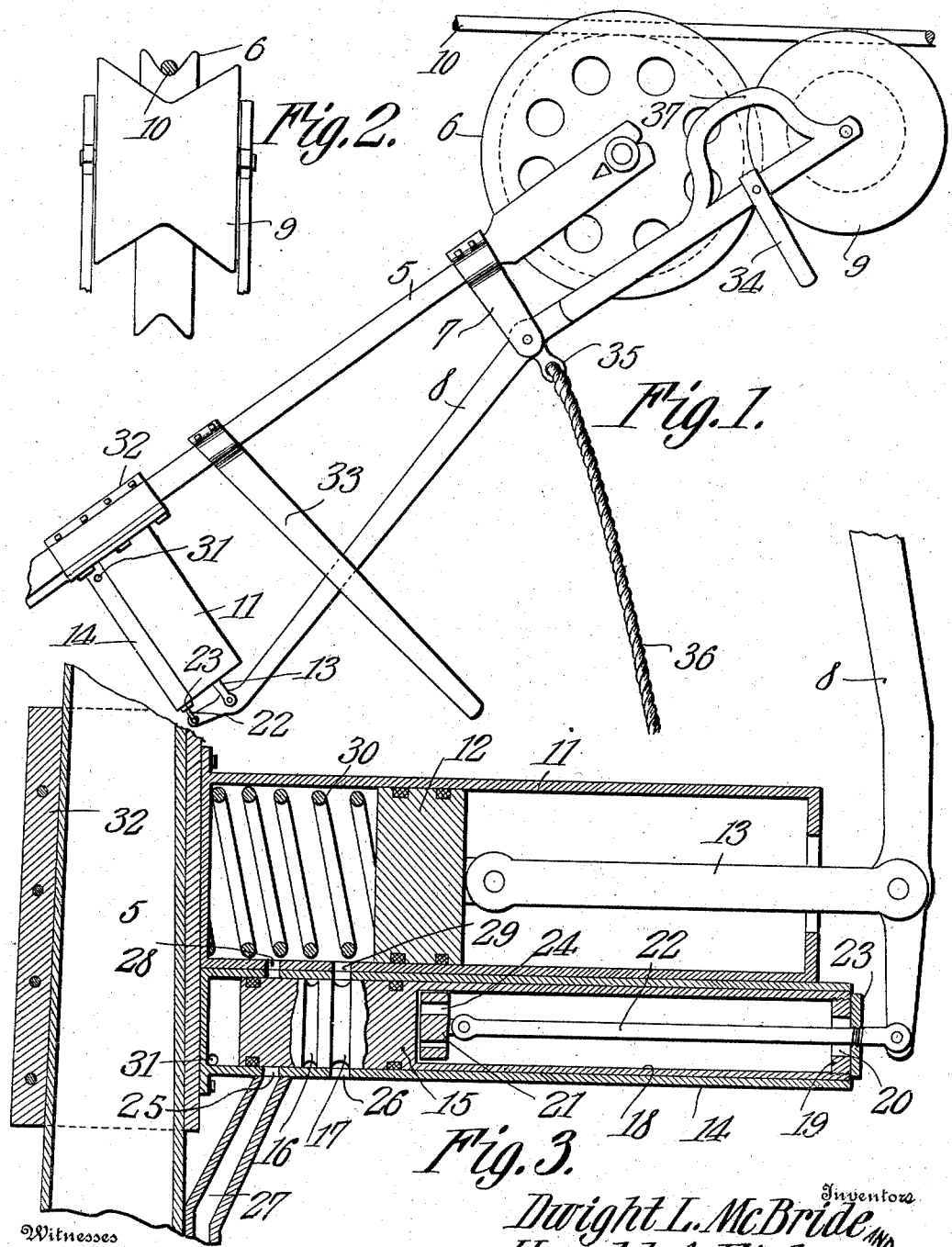

DWIGHT L. McBRIDE AND HAROLD A. FISKE, OF PASADENA, CALIFORNIA.

TROLLEY-REPLACER.

966,847. Specification of Letters Patent. Patented Aug. 9, 1910.

Application filed November 11, 1908. Serial No. 462,125.

*To all whom it may concern:*

Be it known that we, DWIGHT L. MCBRIDE and HAROLD A. FISKE, citizens of the United States, residing at Pasadena, in the county of Los Angeles and State of California, have invented a new and useful Trolley-Replacer, of which the following is a specification.

This invention relates to that class of trolley replacers which are operated by fluid pressure, and the object of the present invention is to provide an improved apparatus of this kind which is entirely automatic in its action, and which operates without stoppage of the car.

The invention also has for its object to provide a replacer which is reliable in operation, it being simple in structure and devoid of complicated parts to get out of order.

A further object of the invention is to provide a replacer which can be mounted upon the trolley pole, and which requires no modification in the structure of said pole, nor of the trolley wheel.

In the accompanying drawings:—Figure 1 is an elevation of the invention: Fig. 2 is an end view of the replacer and the trolley wheel, showing the relative positions thereof. Fig. 3 is an enlarged sectional view of the fluid pressure apparatus for operating the replacer.

Referring more particularly to the drawings, 5 denotes a trolley pole of usual construction, carrying the ordinary trolley wheel 6. On the pole is mounted a bracket 7 to which a lever 8 is fulcrumed. One arm of this lever is forked at its outer end and carries the replacer 9, which is a grooved wheel, of greater width than the trolley wheel, as clearly shown in Fig. 2, the deepest portion of its groove being midway between the sides of the wheel, and in line with the corresponding portion of the trolley wheel groove, in order that the trolley wire 10 may be brought into proper position with respect to the trolley wheel groove, and drop thereinto when the replacer is in operation.

The fluid pressure apparatus for actuating the replacer is operatively connected to the other arm of the lever 8. Said apparatus comprises a cylinder 11, in which a piston 12 works, the piston being connected by a rod 13 to the lever 8. Arranged alongside the cylinder 11 is a valve cylinder 14, containing a piston valve 15, having a pair of peripheral grooves 16 and 17 respectively. The valve 15 has a tubular extension 18 into the outer end of which is screwed a plug 19 having a central opening 20. In this tubular extension a plunger 21 works, which plunger is connected by a rod 22 to the lever 8, said rod passing through the opening 20 in the plug 19, and on said rod is screwed a nut 23, which is so located as to engage the outer face of the plug 19, for a purpose to be presently described. In the plunger 21 are openings 24, in order that it may slide freely back and forth in the tube 18.

In the valve cylinder 14 are ports 25 and 26, respectively, the former being the inlet, and the latter the outlet. The motive fluid, which, preferably, but not necessarily, is compressed air, is led to the port 25 by a pipe 27, from a suitable tank or source of supply carried on the car. The cylinders 14 and 11 are also connected by ports 28 and 29 respectively, the former being in line with the port 25, and the latter with the port 26. It will be seen that when the groove 16 registers with the ports 25 and 28, the motive fluid will enter the cylinder 11, and when the groove 17 is in alinement with the ports 26 and 29, the exhaust from the cylinder 11 takes place. Behind the piston 12 is a spring 30, and behind the valve 15, the wall of the cylinder 14 has a vent opening 31, to equalize the pressure when the said valve moves forwardly.

The two cylinders herein described are secured to the trolley pole by a clamp 32, and on the trolley pole is also mounted a slotted guide stem 33 for the lever 8. The branches of the forked end of said lever are connected by a brace 34. The bracket 7 has an eye 35 for the attachment of the trolley pole rope 36. The branches of the forked end of the lever 8 are formed with integral guards 37. In the event of the trolley pole jumping so far to one side that the replacer misses a trolley wire and should strike one of the guy wires, said guy wire would be prevented, by the guard 37, from dropping into the space between the trolley wheel and replacer, and damage to either structure is thus prevented. There are two of these guards, one on each side of the replacer.

The operation of the replacer is as follows:—When the trolley wheel jumps the wire the trolley pole flies upwardly, whereby the replacer 9 comes into contact with the wire. The weight of the wire then swings the lever 8 in a direction to move the valve 15 into position to establish communication between the inlet port 25 and the cylinder 11. The parts are normally in the position shown in Fig. 3, so that when the lever 8 swings as stated, the nut 23, by reason of its engagement with the plug 19, moves the valve inwardly to the position described. As the piston 12 is also connected to the lever 8, said piston at the same time moves inwardly against the spring 30. When the groove 16 comes into alinement with the ports 25 and 28, the compressed air or other motive fluid passes into the cylinder 11 behind the piston 12 and forces it outwardly, thereby swinging the lever 8 in a direction to elevate the replacer 9, and as said replacer is carrying the wire, the latter is also elevated relatively to the pole 5. This forward movement of the piston 12 is accompanied by a similar movement of the plunger 21 by reason of its connection with the lever 8, and when said plunger strikes the plug 19, the valve is moved forwardly so as to close the inlet, and register the groove 17 with the ports 26 and 29, whereupon exhaust from the cylinder 11 takes place. The weight of the wire on the replacer then lowers the same, and the wire drops back into the groove in the trolley wheel 6. When the replacer lowers as stated, the arm 8 swings in a direction to restore the parts to their normal positions, as shown in Fig. 3. The spring 30 acts as a buffer and prevents the piston 12 from moving rearwardly too far in the cylinder 11.

It will be seen, from the foregoing, that the replacer is simple in construction, and has no complicated parts to get out of order. It is therefore reliable in operation, and can be readily attached to the ordinary trolley pole without altering or modifying the structure thereof.

What is claimed is:—

1. In a trolley-replacer, a lever, a replacer carried thereby, a fluid pressure cylinder, a piston therein connected to the lever, a valve cylinder having inlet and exhaust ports and ports communicating with the aforesaid cylinder, a piston valve controlling the aforesaid ports mounted in the valve cylinder, and having a tubular extension, a plunger working in said extension, an abutment in the extension, a rod connecting the plunger and the lever, and a stop on said rod engageable with the aforesaid abutment.

2. In a trolley replacer, a lever, a replacer carried thereby, a fluid pressure cylinder, a piston therein connected to the lever, a valve cylinder having inlet and exhaust ports, and ports communicating with the aforesaid cylinder, a piston valve controlling the aforesaid ports mounted in the valve cylinder, and having a tubular extension, a plunger working in said extension, a plug in the extension, and having an opening, a rod connected to the plunger, and extending through the opening in the plug and connected to the lever, and a stop on said rod engageable with the plug.

3. The combination with a trolley pole, and its wheel; of a lever pivoted to the pole, a replacer carried by the lever, and engageable by the wire when the wheel leaves the same, a fluid pressure apparatus operatively connected to the lever for swinging the same in a direction to elevate the replacer when it is engaged by the wire, and a valve mechanism controlling the fluid pressure apparatus carried by the pole and operatively connected to the lever.

4. The combination with a trolley pole, and its wheel; of a trolley replacer engageable by the wire when the wheel leaves the same, a fluid pressure apparatus for actuating the replacer to elevate the wire relatively to the pole when the wheel leaves the wire, a valve mechanism controlling the operation of the fluid pressure apparatus, and an actuating connection between the replacer and the valve mechanism.

5. The combination with a trolley pole, and its wheel; of a lever pivoted to the pole, a replacer carried by the lever, and engageable by the wire when the wheel leaves the same, a fluid pressure apparatus connected to the lever for actuating the same to elevate the replacer when it is engaged by the wire, a valve mechanism for said apparatus, and an actuating connection between said mechanism and the lever.

6. The combination with a trolley pole, and its wheel; of a replacer wheel traveling behind the aforesaid wheel, and engageable by the wire when the latter wheel leaves the same, a lever mounted on the pole, and carrying the replacer wheel, a fluid pressure apparatus for actuating the lever to elevate the replacer wheel when it is engaged by the wire, a valve mechanism controlling the operation of the fluid pressure apparatus, and an actuating connection between said mechanism and the lever.

In testimony that we claim the foregoing as our own, we have hereto affixed our signatures in the presence of two witnesses.

DWIGHT L. McBRIDE.
HAROLD A. FISKE.

Witnesses:
JOHN McDONALD,
C. P. DE YOE.